Sept. 1, 1953  J. D. FORE  2,650,863
AUTOMATIC CUTOFF VALVE
Filed June 24, 1949  2 Sheets-Sheet 1
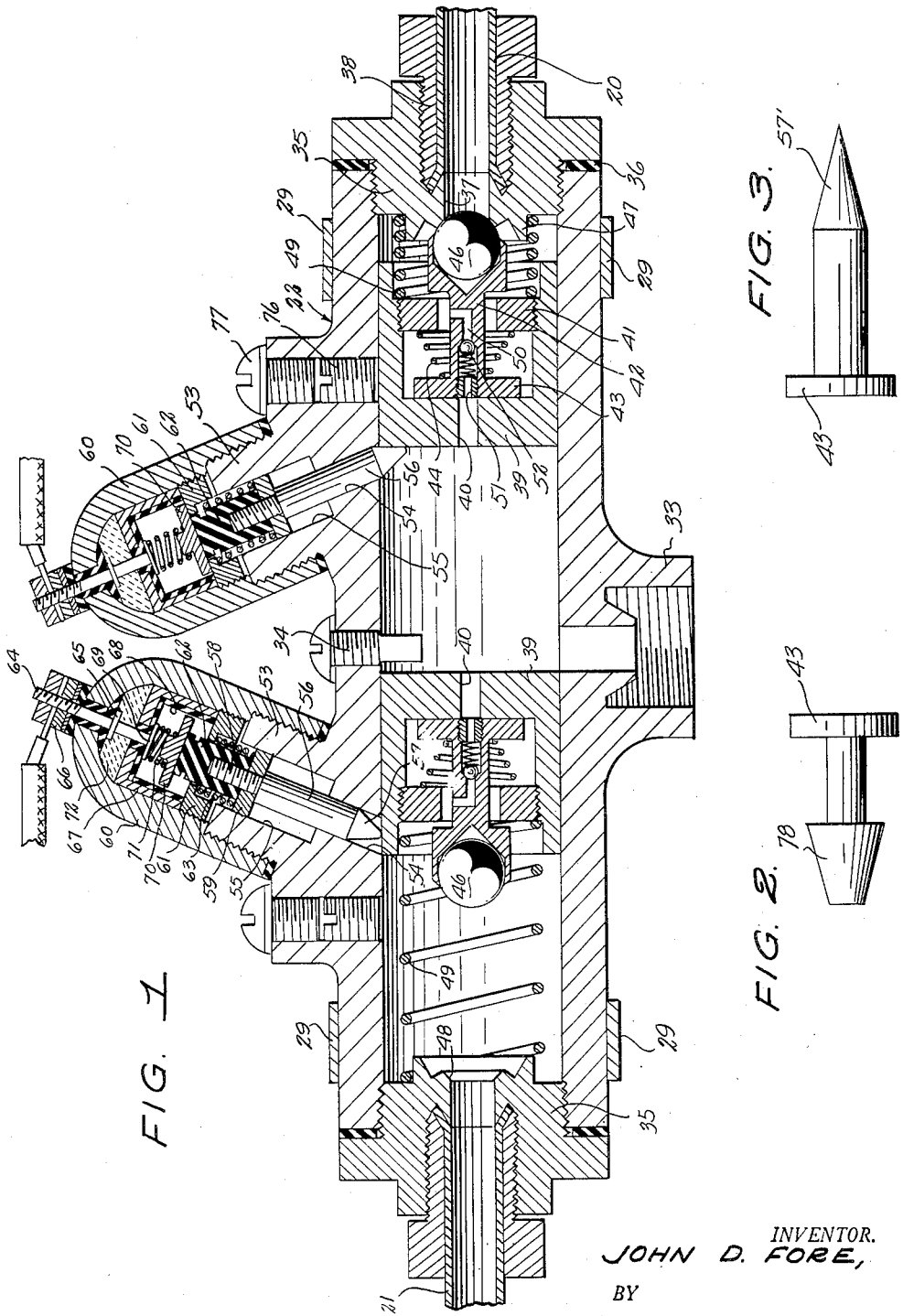
INVENTOR.
JOHN D. FORE,
BY
McMorrow, Berman & Davidson
ATTORNEYS.

Sept. 1, 1953  J. D. FORE  2,650,863
AUTOMATIC CUTOFF VALVE
Filed June 24, 1949  2 Sheets-Sheet 2
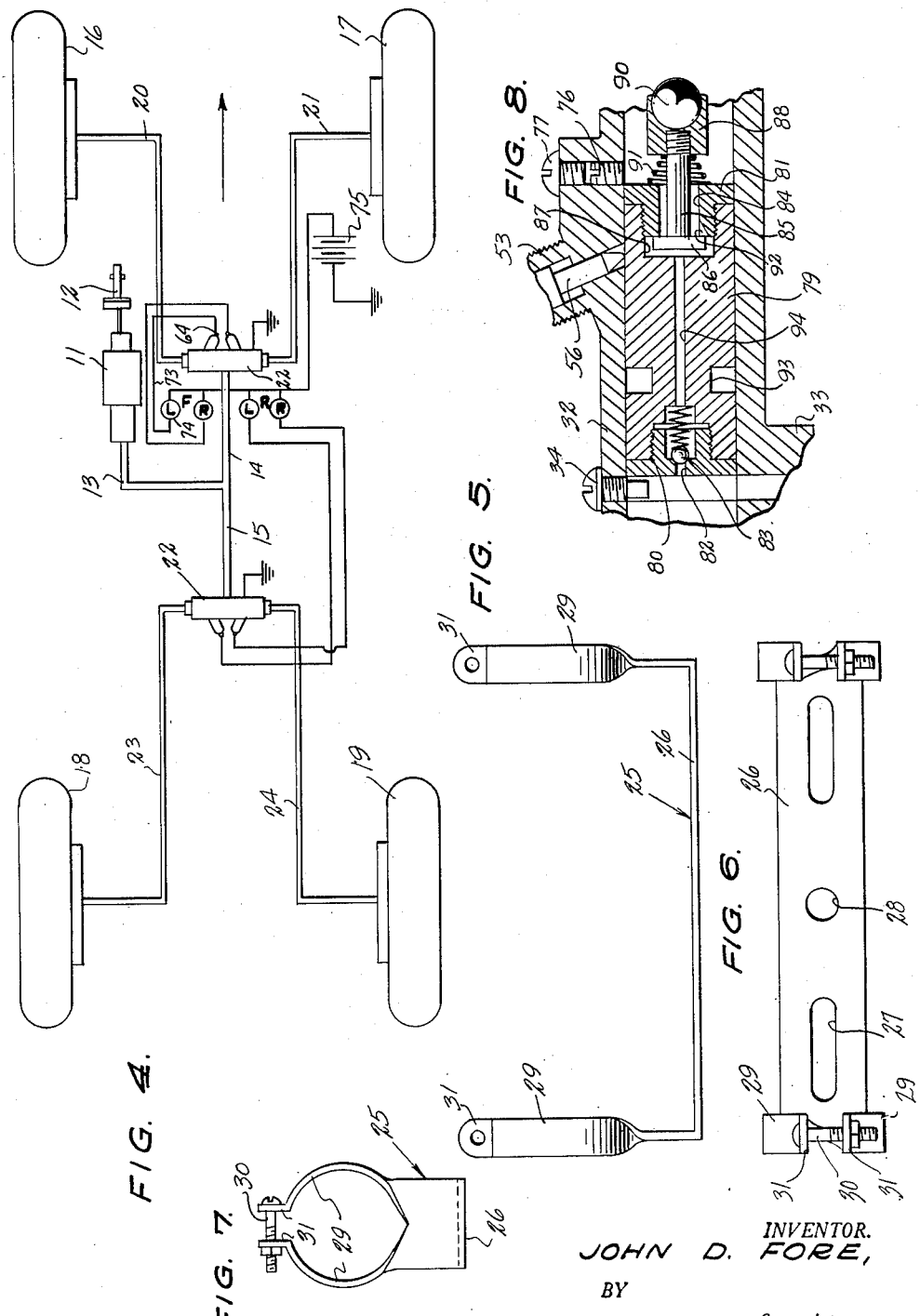
INVENTOR.
JOHN D. FORE,
BY
McMorrow, Berman + Davidson
ATTORNEYS.

Patented Sept. 1, 1953

2,650,863

UNITED STATES PATENT OFFICE 2,650,863

AUTOMATIC CUTOFF VALVE

John D. Fore, San Angelo, Tex.

Application June 24, 1949, Serial No. 101,171

2 Claims. (Cl. 303—84)

This invention relates to hydraulic fluid systems and more particularly to check valve means leading from the master cylinder of an automobile brake system to the respective brake cylinders.

A main object of the invention is to provide a safe and improved automatic cut-off valve device for use in automobile hydraulic brake systems, or other hydraulic systems, said device being constructed for long service-free life, being arranged to automatically compensate for normal wear, expansion and contraction of metals under temperature changes, and arranged to provide the user maximum brake protection with minimum possible risk of braking failure due to improper operation of the valve itself when placed in the brake line leading from the master cylinder to one or more of the brake cylinders of a motor vehicle, said cut-off valve operating automatically to close and shut off fluid from the master cylinder to any portion of the brake system containing a leak or rupture in response to application of pressure to the brake pedal.

A further object of the invention is to provide an improved automatic cut-off valve for use in the hydraulic brake system of a motor vehicle which operates to automatically check the escape of liquid when the brake pedal is depressed in the event that a leak occurs between the master cylinder and one of the brake cylinders of the vehicle, said cut-off valve including signal means for providing an indication as to which portion of the brake system is leaky whereby the defective portion may be readily located and repaired.

A still further object of the invention is to provide an improved automatic cut-off valve for use in the brake lines of a motor vehicle between the master cylinder and one or more of the brake cylinders, the cut-off valve being very simple in construction, easy to install, and being very easy to maintain in operating condition.

A still further object of the invention is to provide an improved automatic cut-off valve for use in a hydraulic fluid system between the master cylinder and one or more of the subsidiary cylinders of the system, said cut-off valve including automatic equalizing means to prevent excessive back pressures from being built up in the fluid lines, and being arranged so that operation of the subsidiary cylinders may be obtained even in the event that portions of the automatic cut-off valve may be jammed or frozen.

Further objects and advantages of the invention will become apparent from the following description and claims, and from the accompanying drawings, wherein:

Figure 1 is a longitudinal vertical cross sectional view taken through an improved automatic cut-off valve for a hydraulic brake system constructed in accordance with the present invention.

Figure 2 is an enlarged elevational detail view of an alternate form of movable valve element which may be employed in the cut-off valve of Figure 1.

Figure 3 is an enlarged elevational detail view of another alternate form of movable valve element which may be employed in the cut-off valve of Figure 1.

Figure 4 is a schematic diagram illustrating in diagrammatic fashion a hydraulic brake system employing cut-off valve members in accordance with the present invention.

Figure 5 is a side elevational view of a bracket member employed to secure the cut-off valve of Figure 1 to the vehicle frame.

Figure 6 is a top plan view of the bracket member of Figure 5.

Figure 7 is an end elevational view of the bracket member of Figure 5.

Figure 8 is a fragmentary longitudinal cross sectional view taken through a portion of a modified form of automatic cut-off valve constructed in accordance with the present invention.

Referring to the drawings, and more particularly to Figure 4, it will be seen that 11 designates a conventional master cylinder operated from the brake pedal 12 of a motor vehicle. The outlet conduit 13 of master cylinder 11 is connected to respective front and rear wheel brake lines 14 and 15. Designated at 16 and 17 are the left front and right front wheels of the vehicle. Designated at 18 and 19 are the left rear and right rear wheels of the vehicle. The left front brake line is shown at 20 and the right front brake line is shown at 21. Designated at 22 is a first automatic cut-off valve. The respective brake lines 20 and 21 are connected to the respective ends of valve 22. The front brake line 14 is connected to the intermediate portion of valve 22. A similar automatic cut-off valve 22 is provided between the rear brake line 15 and the respective rear wheel brake lines, shown at 23 and 24.

Each of the valves 22 is secured to the vehicle frame by a bracket 25 illustrated in Figures 5, 6 and 7, said bracket comprising a longitudinal body portion 26 formed with bolt holes 27 and 28. The ends of body portion 26 are formed with upstanding opposing arcuate clamping fingers 29, 29 adapted to embrace the body of the valve 22 and to clamp same by means of fastening bolts 30 passing through the ends of the fingers 29, 29, said fingers having apertured end tabs 31 receiving the bolts.

Referring now to Figure 1, the automatic cut-off valve 22 may comprise a generally cylindrical body 32 formed at its intermediate portion with a conduit fitting 33 to which the master brake cylinder fluid line 14 or 15 may be connected. Threaded through the wall of body 32 opposite inlet fitting 33 is an inwardly projecting stop screw 34. Threadedly secured in each end of body 32 is a flanged plug 35, a deformable ring gasket 36 being interposed between the flange of the plug and the end of body 32 to provide a fluid tight seal. Each plug 35 has an axial bore 37. Connected to the plugs by means of threaded bushings 38 are the respective brake cylinder conduits, such as the conduits 20 and 21 shown in Figure 1.

Slidably mounted in the cylinder 32 are the respective oppositely facing cup-like piston members 39, 39. The end wall of each member 39 is formed with an axial bore 40. Threadedly secured in each member 39 is a ring member 41. Axially positioned in each member 39 is a movable valve element 42 passing through the associated ring member 41. At its inner end the valve element 42 is formed with an annular flange 43. Encircling the valve element and bearing between flange 43 and the associated ring member 41 is a conical spring 44, biasing flange 43 against the end wall of piston member 39. At its outer end, each valve element 42 is formed with a cupped head 45 in which is secured a valve ball 46. The inner end of each plug 35 is formed with a boss 47, said boss being formed with a spherical valve seat 48 adapted to receive the valve ball 46 in sealing relation thereon. A coiled spring 49 is seated around each boss 47, said spring bearing on the associated ring member 41 and biasing the associated piston member 39 inwardly of the cylinder 32. Each valve element 42 is formed with a passage 50 opening at its intermediate portion and extending through the shank of the valve element to the inner end of said element wherein is positioned a threaded sleeve 51. The passage 50 is enlarged adjacent sleeve 51 and contains a spring pressed ball check valve 52 closing off the passage 50 to outward flow of fluid from sleeve 51 toward the reduced portion of the passage but allowing reverse flow through the passage from the space around the valve element toward the inner end of said valve element. As shown in Figure 1, the spring 44 holds flange 43 in abutment with the end wall of piston member 39, whereby the sleeve 51 is in communication with axial bore 40. Spring 44 biased against flange 43, of part 42, not only prevents any fluid from returning from the subsidiary cylinder fluid lines 20 and 21 through passage 40 but also performs the dual purpose of forming a check valve out of flange 43, permitting only the flow of fluid under pressure towards the fluid lines 20 and 21, and in conjunction with spherical valve seat 48 and boss 47 permits the movable sealing element 46 to be resilient and self aligning with the fixed seat 48.

The cylinder body 32 is symmetrically formed at its intermediate portion with the upwardly and inwardly inclined axially bored externally threaded bosses 53, 53, as viewed in Figure 1, the lower portions of the bores thereof being shown at 54, 54. The upper portions of said bores are enlarged, as shown at 55, to define cylindrical spaces coaxial with the lower bore portions 54. Each lower bore portion has slidably positioned therein a detent pin 56 having a conical end 57. The top end of each pin is formed with a reduced threaded stud 58. Threaded on stud 58 and bearing on the shoulder defined at the base of the stud is a hexagonal washer 59 slidable in the enlarged cylindrical bore portion 55. Threaded on each boss 53 is a cap 60. Threaded inside cap 60 is an inwardly flanged ring 61. Threaded on the stud 58 is an insulating cap 62. Encircling cap 62 is a coiled spring 63 bearing between washer 59 and the inwardly extending flange of ring 61, biasing detent pin 56 downwardly. Axially secured in the top end of each cap 60 and insulated therefrom is a terminal bolt 64 having an integral collar 65 cooperating with a nut 66 to rigidly fasten the bolt to the cap. Positioned in the cap 60 is a downwardly facing cup member 67 having an insulating liner 68. The lower end of bolt 64 extends through the end wall of cup member 67 and is insulated therefrom. Said lower end carries a contact disc 69. Designated at 70 is a contact plate bearing on the end of cap 62 and biased into engagement therewith by a coiled spring 71 seated on plate 70 around a central stud formed thereon and bearing on disc 69. The space in cap 60 between cup member 67 and the top of the cap 60 is filled with sealing material 72. Said sealing material may be compressed by adjusting the position of ring 61 upwardly in the cap 60.

As shown in Figure 4, each terminal bolt 64 is connected by a wire 73 to one terminal of an indicator lamp 74. The other terminal of each lamp is connected to the positive pole of a battery 75. The negative pole of the battery is grounded. The valve 22 is also grounded. Therefore when contact plate 70 is allowed to engage ring 61 the associated lamp 74 becomes energized through a circuit comprising the positive terminal of battery 75, the signal lamp 74, wire 73, terminal bolt 64, spring 71, plate 70 and ring 61 to ground.

From Figure 1 it will be seen that normally pin 56 is held in elevated position by engaging the wall of piston 39, as seen at the left side of Figure 1. When the brake lines are in normal operating condition, depression of the brake pedal will cause the master cylinder to force more brake fluid into the valves 22 through the inlet conduits 33. The fluid will enter the space between the pistons 39, 39 and cause the pistons to move toward their sealing off positions, but as soon as the wheel brake cylinders force the brake shoes against the brake drums, the back pressure becomes equal to the applied pressure from the master cylinder and the pistons 39 stop before they reach their locking positions. Upon release of pressure on the master cylinder side, the pistons 39 are pushed back to their starting positions against stop screw 34. Because bores 40 are small in area in comparison to the area of the ends of pistons 39, and because pressure is equally applied in all directions, the pistons move and fluid only flows through bores 40 to compensate for the small normal losses of fluid in the wheel cylinder side, or to provide a free path for the brake fluid should the pistons 39 be locked for any reason in their open positions (as they would be to install them and bleed the lines) so that the valve in itself would not cause the loss of brake fluid fed through it. Bores 40 are normally held closed by the flanges 43 and the action of conical springs 44 thereon, preventing the loss of much fluid should a line break before pressure is applied, and at the same time provide a large bypass channel when pressure is applied, thus giving a greater degree of safety than could be had by a small normally open bypass channel.

If one of the brake lines is broken or leaky, the back pressure on the associated piston member 39 will be relatively small and the piston member will be therefore moved outwardly under the applied brake fluid pressure, causing the ball valve element 46 carried thereby to engage in its seat 48 and close off the defective brake line. The valve is so designed that the sealing element 46 and seat 48 engage only when there is any abnormal movement of the piston. The resilient self-aligning sealing element 46 is pulled into alignment with its fixed seat 48 even though it may have been off alignment before pressure is applied to close the seats. This resilient self-aligning means of the seats is accomplished by the way the movable valve seat 46 is resiliently supported by part 42 and spring 44 within the enlarged cavity of the piston body 39 permitting the resilient self-aligning sealing element 46 to move in any radial direction around its axis and be pulled into self-alignment with its fixed seat 48 by the inverted conical boss 47 around fixed seat 48. This resilient self-aligning means used between the movable and fixed valve seats permits the use of a far greater range of tolerances used in the manufacturing of the valve seats, pistons, bodies, and the body end caps. These resilient self-aligning valve seats, in conjunction with the inclined detent member, makes the valve able to automatically compensate for inaccuracies around both its vertical and horizontal axis, and thereby permitting the valve to be adapted to the mass production and assembly line methods of production so necessary for economical production. At the same time, the inner end of said piston member slips past the tip of the associated detent pin 56, allowing said pin to be moved downwardly and forwardly by its spring 63 until all slack is taken up between pin 56 and the end of piston 39, as shown at the right side of Figure 1, whereby the ball 46 thereof is maintained in sealing position thereafter until the brake line is repaired and the pin 56 is manually reset. Because of the angle at which the detent pin 56 is mounted, its end moves forward as it moves downward, thereby enabling the valve to be automatically compensated for normal wear, contraction and expansion of the metal in the valve due to temperature variation, and small inaccuracies in manufacturing, thereby assuring the sealing of the metal valve seats under pressure and not merely a touching fit of the seats. The ball valve element 46 is held against its seat 48 under pressure not because of the strength of spring 63 pushing against detent pin 56, but because spring 63 pushes detent pin 56 as far down as possible, while pressure is applied to piston 39 from the master cylinder. Then when the fluid pressure is released from piston 39, said piston tries to return to its open position, but due to the square end of piston 39 and the shape of the end 57 of detent pin 56, the sidewise back pressure locks the detent pin instead of pushing it upward, thereby locking the valve in its sealing position under pressure. Under the conditions represented at the right side of Figure 1, the contact plate 70 engages the ring 61, causing the associated signal lamp 74 to become energized.

After the defective brake line has been repaired, the pin member 56 may be reset by removing the associated cap and manually lifting the insulating cap 62 secured to the top end of said pin member. The spring 44 associated with the piston member 39 formerly locked by the pin member then returns the piston member to normal position.

An adjustable screw 76 is provided in the wall of the body 32 adjacent each boss 53 which may be manually turned to project into the body to prevent the piston member 39 associated therewith from moving to closing position during the bleeding of the brake lines subsequent to the repair operation. Screw 76 is normally covered by a headed screw 77, said screw 77 being readily removable to afford access to screw 76.

Under normal operative conditions of the brake lines, the building up of excessive back pressures in said lines for any reason is prevented by the provision of the ball check valves 52 which allow flow of brake fluid from the lines toward the master cylinder.

The movable valve element 42 may have a ball tip, as shown at 46, in Figure 1, a sharp conical tip, as shown at 57' in Figure 3, or a truncated conical tip, as shown at 78 in Figure 2, or some combination of all three.

The inclined position of the detent pin affords a substantial forward movement of the tip of the pin as it moves downwardly, whereby looseness of locking engagement is avoided, automatically compensating for normal wear, expansion and contraction of the metal due to temperature changes and permitting parts to be machined and assembled at a substantially broader margin of working tolerances, thereby making the valve less critical in adjustment and giving it a safer and longer trouble-free life.

In the embodiment of the invention shown in Figure 8, the valve body 32 contains the respective axially bored pistons 79, each piston having secured to its inner end a plug member 80 and to its outer end a plug member 81. Plug member 80 is axially bored at 82 and contains the spring-pressed ball check valve 83 preventing return flow of fluid toward the master cylinder. Plug member 81 is formed with a large cylindrical passage 84. Designated at 85 is a valve element disposed axially in plug member 81 and formed with a head 86 located in a cavity 87 formed in the piston body. Secured to the outer end of element 85 is the block member 88 in which is secured the valve ball 90. A conical spring 91 encircles the element 85 and bears between block 88 and plug member 81, biasing head 86 against the inner wall surface of the plug member. The inner bore of the plug member is further recessed at 92 to define a passage for brake fluid into passage 84 past head 86. The piston body 79 is formed with an annular groove 93 into which the tip of the detent pin 56 may engage to lock the piston 79 in sealing position responsive to the application of braking pressure when the back pressure on the piston fails due to a broken or leaky brake line.

Ball check valve 83 prevents loss of any great amount of fluid should any line be broken before pressure is applied to the master cylinder causing the valve to close. The use of ball check valve 83 permits the use of a larger axial valve passage, shown at 94, than would otherwise be feasible, and will permit enough fluid to pass through so that the operation of the brakes is not affected even when the piston freezes in open position. This check valve 83 is also used for installing and bleeding the line while installing the valve, as well as for equalization of pressure between the master cylinder and the wheel cylinders. Spring 91 holds the rear face of head 86 away from the end opening of bore 94, allowing fluid to flow around head 86 during normal operation of the brakes. When a leak develops in the brake lines, operation of the brake pedal causes the piston 79 to move ball 90 to seating position, the head 86 being then in sealing contact with the wall of recess 87 around the opening of bore 94. At the same time, the locking pin 56 moves downwardly into the locking groove 53.

Due to the angular position of the locking pin, the valve piston is held sealed under pressure even after pressure has been released from the master cylinder. As above mentioned, the angular position of the pin and the conical shape of its tip enables a good metal-to-metal seal to be obtained without requiring any great amount of precision in making and adjusting the valve, as would be required in a right-angularly positioned locking pin.

While certain specific embodiments of an automatic cut-off valve for use in hydraulic fluid systems have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. An automatic cut-off valve for use in a hydraulic fluid system comprising a master cylinder, subsidiary cylinder and first cylinder, conduit means connecting said first cylinder to the master cylinder of the system, additional conduit means connecting said first cylinder to the subsidiary cylinder, a piston in said first cylinder, said piston being formed with a passage therethrough, said passage normally held closed by spring pressed check valve, said check valve permitting only the flow of fluid under pressure towards said additional conduit means, a sealing element carried by said piston and sealingly engageable in a seat connected to said additional conduit means responsive to abnormal movement of the piston toward said seat spring means opposing such movement, and an inclined spring pressed detent member extending slidably through a wall of said first cylinder and normally engaging the side of said piston, the detent member being lockingly engageable behind the piston when said piston has been moved into sealing position with respect to said seat.

2. An automatic cut-off valve for use in a hydraulic fluid system comprising a master cylinder, subsidiary cylinder and first cylinder, conduit means connecting said first cylinder to the master cylinder of the system, additional conduit means connecting said first cylinder to the subsidiary cylinder, a piston in said first cylinder, said piston being formed with a passage therethrough, a sealing element carried by said piston and sealingly engageable in a seat connected to said additional conduit means responsive to abnormal movement of the piston toward said seat, spring means opposing such movement, resilient self aligning means acting between said sealing element and said seat, said resilient self aligning means normally holding said sealing element sealingly against the portion of the piston adjacent the passage therethrough permitting only the flow of fluid under pressure toward said additional conduit means, said sealing element being formed with a second passage communicating with the piston passage and opening laterally of the element, a normally closed check valve in said second passage allowing only return flow of fluid under pressure through piston passage toward said conduit means, an inclined spring pressed detent member extending slidably through a wall of said first cylinder and normally engaging the side of said piston, the detent member being lockingly engageable behind the piston when said piston has been moved into sealing position with respect to said seat.

JOHN D. FORE.

References Cited in the file of this patent

UNITED STATES PATENTS

| Number | Name | Date |
|---|---|---|
| 2,093,015 | Madden | Sept. 14, 1937 |
| 2,128,853 | Roen | Aug. 30, 1938 |

FOREIGN PATENTS

| Number | Country | Date |
|---|---|---|
| 486,512 | Great Britain | Sept. 2, 1936 |